No. 694,791. Patented Mar. 4, 1902.
R. E. SACK.
STEERING GEAR.
(Application filed Feb. 17, 1900.)
(No Model.)
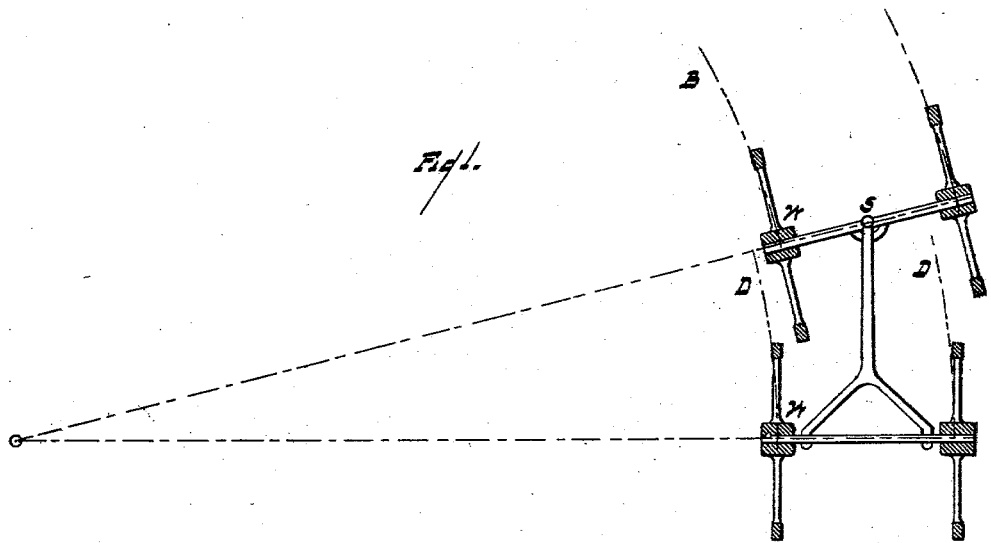
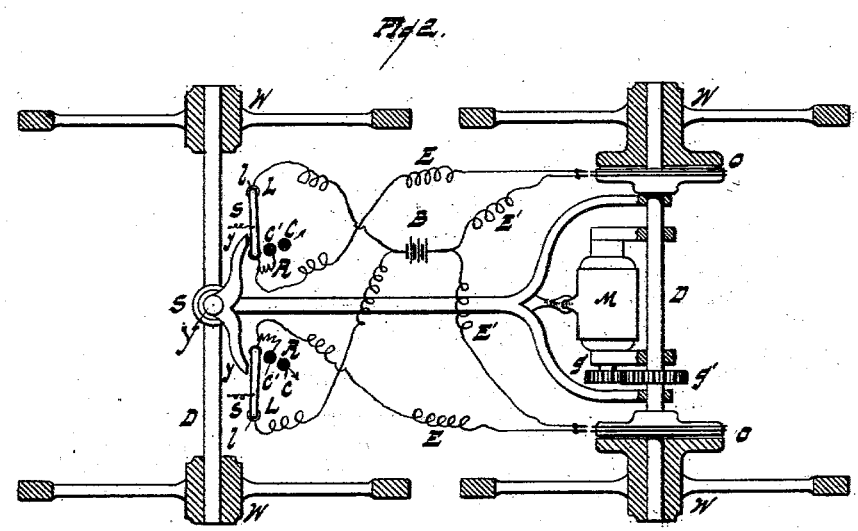
WITNESSES
INVENTOR
Richard E. Sack,
By Parker & Burton
Attorneys.

UNITED STATES PATENT OFFICE.

RICHARD E. SACK, OF DETROIT, MICHIGAN.

STEERING-GEAR.

SPECIFICATION forming part of Letters Patent No. 694,791, dated March 4, 1902.

Application filed February 17, 1900. Serial No. 5,569. (No model.)

*To all whom it may concern:*

Be it known that I, RICHARD E. SACK, a citizen of the United States, residing at 88 Preston street, Detroit, county of Wayne, State of Michigan, have invented a certain new and useful Improvement in Steering-Gear; and I declare the following to be a full, clear, and exact description of the invention, such as will enable others skilled in the art to which it pertains to make and use the same, reference being had to the accompanying drawings, which form a part of this specification.

My invention relates to improvements in appliances for guiding self-propelling vehicles, such as are used on common roads, wherein an axle or a wheel or wheels of a vehicle are turned upon a pivot or pivots in order to direct the course of the vehicle. This is usually done by an attachment termed the "steering-head," adapted to be operated by the rider. As the line of travel during the period of changing the direction is curved upon the arcs of circles with varying diameters, it follows that the wheels upon the outer side of the vehicle have to travel a greater distance than those on the inner side toward the center of the circle on which the vehicle is turned. This prevents in most cases the pairs of wheels from being rigidly attached to a common axle, as the wheels are necessarily of the same diameter, and if run upon a curve one wheel or the other must necessarily slip with such a construction. Therefore an independent axle carrying wheels loose thereon and being operated by clutches is sometimes employed in order to permit a certain amount of freedom of motion between the wheel and the axle. Compensating gears are also used for this purpose.

My invention is adapted to be used where clutches are used, especially that character of clutches actuated by electricity or controlled by electromagnets; and its object is to provide means whereby one of the clutches of a pair and operating one of a pair of wheels shall be automatically loosened or released, so as to enable the vehicle to turn on a curve without undue strain, and this is effected by the means hereinafter described and claimed.

In the drawings, Figure 1 is a diagrammatic representation of the turning of a vehicle upon a curve having any assignable center, as C. Fig. 2 is a diagrammatic plan view of my invention, omitting unnecessary details, which are all well known and which do not in themselves form a part thereof.

In the drawings similar letters refer to similar parts.

In the drawings, W W represent the wheels in section. D D represent the axles thereof.

M is the motor for driving the vehicle.

$g$ $g'$ represent the gearing, the pinion $g$ being attached to the shaft of the motor and the spur-wheel $g'$ being attached to the axle D.

O O are magnetic clutches interposed between the shaft or axle D and the hub of the wheels W W. It is unnecessary to describe the details of these clutches, as they are well known and as such details do not form any part of my invention. The clutches are actuated, however, by a source of electricity, preferably a storage-battery B, through the circuits E E', and between the battery B and that branch of the circuit marked E is interposed upon either side switches L L, which consist of swinging arms pivoted at $l$ $l$.

R R are resistances of any assignable degree, located between the switch or contact-points C' C'. It will be noted that the resistances R R are interposed between two contact-points in each set and that the third contact-point (the farthest one from the axle) is not connected to the circuit in any manner. It follows, therefore, that if the switches L L are swung from the first contact-point, as represented in the drawings, to the middle contact-point or either of them are so swung the resistance R, corresponding thereto, would be included in the circuit, whereas if the switch L is swung to the extreme contact-point on either side the circuit on that side will be broken. Therefore the clutches in that circuit will be inoperative. If it was only swung to the center points, the magnetic force upon the clutch would have weakened by virtue of the interposed resistance R. It is obvious that the magnetic force upon the clutch or clutches can be weakened by virtue of the interposed resistance R, as shown, or by a variation of electromotive force in the electrical circuits, or by permutation of the windings, or by shunting the whole or part of the windings of the electric clutches by resistances, or by other means well known in the art, and I do not limit myself to the use of the interposed resistance, as shown.

Upon the stearing-head is a yoke Y, having extremities y y in proximity to the switches L L. The switches L L are controlled by springs s s, connecting them and the axle D, so that when the front axle is parallel to the rear axle the two switch-arms are driven by the springs to the contact-points nearest to the axle, thus cutting out the resistance and making a direct circuit and operating the clutches O O by two circuits. As the yoke is rigidly attached to the steering-head and follows the motion of the axle D, it follows that if the axle be turned in the position shown in Fig. 1 that the switch-arm L nearest to the wheel upon the inner side of the turning-circle will be shifted by one end of the yoke Y coming in contact with it over to either the center contact, and thereby interposing the resistance R in the circuit and to some extent weakening the force supplied to the corresponding clutch, or if the axle be turned far enough or to the extremity of the turning movement the switch L will be shifted to the further one of the contact points, and thus the circuit upon that side which actuates the clutches will be broken. Of course if the action of the clutches be very much weakened or broken entirely it will allow the wheel upon the inside of the circle to revolve independently of the axle, the driving force being thrown upon the outer wheel through the clutch which remains intact, it being obvious that the battery B and the appliances can be readily supported by the body and that the means and manner of such support is entirely one of mechanical skill. It is also obvious that the detail arrangements of this mechanism could be very much modified without departing from the invention.

The mode of operation is clearly apparent from the foregoing description.

What I claim is—

1. In a self-propelling vehicle having means for governing the direction of its movement, the combination of the steering-head, means thereon for operating switches, said switches controlling magnetic clutches connecting the motor to the driving-wheels, said motor and said driving-wheels whereby the movement of the lever turning the steering-wheels will actuate contacts in such manner as to partially or wholly release the clutch connecting the driving wheel and axle on that side of the vehicle toward which the change of direction is made, substantially as described.

2. In a self-propelling vehicle, the combination of wheels driven by magnetic clutches interposed between the wheels and the driving-axle, resistances interposed in the electric circuits of the clutches and means whereby one of the resistances may be thrown into the circuit upon either side upon the operation of the steering device, and such steering device, substantially as described.

3. In a self-propelling vehicle, the combination of a steering-head, of contacts and resistances substantially as described for controlling the magnetic clutches connecting the driving-wheel and driving-axle thereof, said driving-wheel and driving-axle and means for driving the vehicle connected to the said driving-axle, substantially as described.

4. In combination, the wheels, the electromagnetic clutches, one being provided for driving each wheel, circuit connections, and a steering-handle and contacts controlled by said steering-handle, said contacts in turn controlling the two circuits of the electromagnetic clutch, whereby the current will normally flow through both clutches for actuating both wheels or by shifting the steering-handle, to open one circuit while maintaining the other closed to render one wheel free and drive the other, substantially as described.

In testimony whereof I sign this specification in the presence of two witnesses.

RICHARD E. SACK.

Witnesses:
JOHN N. GOODRICH,
R. A. PARKER.